(12) United States Patent
Park

(10) Patent No.: US 7,256,851 B2
(45) Date of Patent: Aug. 14, 2007

(54) ARRAY SUBSTRATE FOR IN-PLANE SWITCHING LIQUID CRYSTAL DISPLAY DEVICE AND MANUFACTURING METHOD OF THE SAME

(75) Inventor: Ki-Bok Park, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 37 days.

(21) Appl. No.: 10/233,594

(22) Filed: Sep. 4, 2002

(65) Prior Publication Data

US 2003/0043329 A1    Mar. 6, 2003

(30) Foreign Application Priority Data

Sep. 5, 2001    (KR) ............................... 2001-54585

(51) Int. Cl.
*G02F 1/1343*    (2006.01)

(52) U.S. Cl. ...................... 349/141; 349/138; 349/139

(58) Field of Classification Search ................ 349/141, 349/138, 143, 43, 38, 139, 187
See application file for complete search history.

(56) References Cited

U.S. PATENT DOCUMENTS

| 5,598,285 | A |   | 1/1997 | Kondo et al. .................. 349/39 |
| 5,745,207 | A |   | 4/1998 | Asada et al. .................. 349/141 |
| 5,838,037 | A |   | 11/1998 | Masutani et al. ............ 257/296 |
| 5,852,485 | A | * | 12/1998 | Shimada et al. ............ 349/141 |
| 5,946,060 | A |   | 8/1999 | Nishiki et al. ................ 349/48 |
| 5,990,987 | A |   | 11/1999 | Tanaka ......................... 349/43 |
| 6,028,653 | A |   | 2/2000 | Nishida ....................... 349/141 |
| 6,097,454 | A |   | 8/2000 | Zhang et al. .................. 349/43 |
| 6,177,970 | B1 | * | 1/2001 | Kim ............................. 349/43 |
| 6,259,502 | B1 | * | 7/2001 | Komatsu ..................... 349/141 |
| 6,449,027 | B2 | * | 9/2002 | Lee et al. .................... 349/141 |
| 6,583,840 | B1 | * | 6/2003 | Inoue et al. ................. 349/141 |
| 6,697,141 | B2 | * | 2/2004 | Yamakita et al. ........... 349/141 |
| 6,704,085 | B2 | * | 3/2004 | Nishimura et al. ......... 349/141 |
| 2002/0154262 | A1 | * | 10/2002 | Yamakita et al. |

FOREIGN PATENT DOCUMENTS

JP    09-005764    1/1997

(Continued)

OTHER PUBLICATIONS

R. Kiefer et al.; "In-Plane Switching of Nematic Liquid Crystals"; Japan Display '92; pp. 547-550.

(Continued)

*Primary Examiner*—Thoi V. Duong
(74) *Attorney, Agent, or Firm*—McKenna Long & Aldridge LLP

(57) ABSTRACT

An array substrate for an in-plane switching liquid crystal display device includes a substrate, a gate line and a data line crossing each other to define a pixel region on the substrate, a thin film transistor being electrically connected to the gate and data lines, a common line parallel to the gate line, a plurality of common electrodes being perpendicularly connected to the common line, and a plurality of pixel electrodes alternating with the plurality of common electrodes, wherein each common electrode has at least one first incline plane.

24 Claims, 9 Drawing Sheets

FOREIGN PATENT DOCUMENTS

| | | |
|---|---|---|
| JP | 09-073101 | 3/1997 |
| JP | 09-101538 | 4/1997 |
| JP | 09-105908 | 4/1997 |

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

S. Endoh et al.; "Diagonal Super-TFT-LCDs with Mega Wide Viewing Angle and Fast Response Speed of 20 ms"; IDW '99; pp. 187-190.

* cited by examiner

ARRAY SUBSTRATE FOR IN-PLANE SWITCHING LIQUID CRYSTAL DISPLAY DEVICE AND MANUFACTURING METHOD OF THE SAME

This application claims the benefit of Korean Patent Application No. 2001-54585, filed on Sep. 5, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for an in-plane switching liquid crystal display (IPS LCD) device and a method of manufacturing the same.

2. Discussion of the Related Art

In general, a liquid crystal display (LCD) device has upper and lower substrates, which are spaced apart and face each other, and a liquid crystal layer between the upper and lower substrates. Each of the substrates includes an electrode, and the electrodes of each substrate also face each other. The LCD device uses an optical anisotropy of liquid crystal and produces an image by controlling light transmissivity by varying the arrangement of liquid crystal molecules, which are arranged by an electric field.

Because LCD devices have high resolution and can display an excellent moving image, they are used widely. Typically, an LCD device includes thin film transistors and pixel electrodes arranged in a matrix. Such an LCD device is referred to as an active matrix liquid crystal display (AMLCD).

In the LCD device, the liquid crystal layer generally is driven by an electric field that is perpendicular to the upper and lower substrates. The LCD device has a high transmittance and a high aperture ratio. The common electrode of the upper substrate may be grounded so that breakdown of the device due to static electricity may be prevented.

However, the LCD device has a disadvantage of a narrow viewing angle. To overcome the narrow viewing angle, an in-plane switching (IPS) LCD device has been developed. The IPS LCD device implements an electric field that is parallel to the substrates. A detailed explanation of a conventional IPS LCD device and its operation modes will be provided with reference to the following figures.

FIG. 1 is a schematic cross-sectional view of a related art in-plane switching liquid crystal display (IPS LCD) device. As shown in FIG. 1, upper and lower substrates 10 and 20 are spaced apart from each other, and a liquid crystal layer 12 is interposed there between. The upper and lower substrates 10 and 20 are referred to as a color filter substrate and an array substrate, respectively. Common and pixel electrodes 36 and 38 are disposed on the lower substrate 20. The common and pixel electrodes 36 and 38 are parallel with each other and spaced apart from each other. Molecules of the liquid crystal layer 12 are aligned by a lateral electric field 21 between the common and pixel electrodes 36 and 38 when voltage is applied to the common and pixel electrodes 36 and 38.

FIGS. 2A and 2B are cross-sectional views illustrating operations of the liquid crystal molecules for IPS mode in "on" and "off" states. FIG. 2A conceptually illustrates "off state" operation modes for a related art IPS LCD device. In the off state, the long axes of the liquid crystal molecules 12 are parallel to the common and pixel electrodes 36 and 38 on the lower substrate 20, and maintains an initial arrangement according to an alignment layer, which is made by a method such as a rubbing.

FIG. 2B conceptually illustrates "on state" operation modes for a related art IPS LCD device. In the "on state", an in-plane electric field 21 parallel to the upper and lower substrates 10 and 20 is generated between the common and pixel electrodes 36 and 38. The common electrode 36 and pixel electrode 38 are formed together on the lower substrate 20 for this reason. Thus, in an "on state" most of the liquid crystal molecules 12b are aligned such that the long axes thereof are parallel to the substrates 10 and 20 and perpendicular to the common and pixel electrodes 36 and 38, while the liquid crystal molecules 12a over the common and pixel electrodes 36 and 38 maintain an initial arrangement e.g., parallel to the common and pixel electrodes 36 and 38.

As stated above, the IPS LCD device uses the lateral electric field that results from the common and pixel electrodes 36 and 38 being formed on the same substrate, e.g., the lower substrate 20. The IPS LCD device has a wide viewing angle and low color dispersion. Specifically, the viewing angle of the IPS LCD device may be within a range of about 80 to 85 degrees in the directions up, down, right, and left. In addition, the fabricating processes of this IPS LCD device are simpler than other various LCD devices.

FIG. 3 is a plan view of an array substrate for a related art in-plane switching liquid crystal display (IPS LCD) device. As illustrated in FIG. 3, a gate line 32 is formed horizontally in the context of the figure, and a data line 44 extends vertically in the context of the figure. The gate line 32 and the data line 44 cross each other to define a pixel area "P". A thin film transistor "T" is formed at the crossing of the gate line 32 and the data line 44. The thin film transistor "T" includes a gate electrode 34, a source electrode 46, a drain electrode 48, and an active layer 40. The gate electrode 34 is a part of the gate line 32 and the source electrode 46 is connected to the data line 44.

A common line 37 is formed parallel to the gate line 32. A common electrode 36 is formed in the pixel area "P". The common electrode 36 includes a plurality of first and second vertical parts 36a and 36b and a horizontal part 36c. The horizontal part 36c overlaps the common line 37 and is connected to the common line 37 through a first contact hole 53. The plurality of first and second vertical parts 36a and 36b extend up and down from the horizontal part 36c, respectively and are parallel to the data line 44. The first and second vertical parts 36a and 36b are spaced apart from the data line 44.

A pixel electrode 38 is also formed in the pixel area "P". The pixel electrode 38 is composed of a plurality of vertical parts 38a and a horizontal part 38b. The horizontal part of the pixel electrode 38b overlaps the gate line 32 to form a storage capacitor "C". The vertical parts of the pixel electrode 38a have an alternating arrangement with the first and second vertical parts of the common electrode 36a and 36b. The pixel electrode 38 is connected to the drain electrode 48 through a second contact hole 54.

The common electrode 36 may be made of the same material as the gate line 32 and the pixel electrode 38 may be made of the same material as the data line 44.

Next, FIGS. 4A and 4B are cross-sectional views along the line IVA-IVA and the line IVB-IVB of FIG. 3, respectively. As shown in the figures, a gate electrode 34 and a plurality of common electrodes 36b, which are referred to as the second vertical parts of common electrode in FIG. 3, are formed on a substrate 20. The plurality of common electrodes 36b may be made of the same material as the gate electrode 34. A gate insulator 35 covers the gate electrode 34 and the plurality of common electrodes 36b. An active layer 40 and an ohmic contact layer 41 are subsequently formed on the gate insulator 35. Additionally, source and drain electrodes 46 and 48 are formed on the ohmic contact layer 41. Meanwhile, a data line 44 and which is made of the same material as the source and drain electrodes 46 and 48, is formed on the gate insulator 35 not overlapping the common electrodes 36b. A passivation layer 52 covers the data line 44, source and drain electrodes 46 and 48. The passivation layer 52 has a contact hole 54, which is referred to as a second contact hole in FIG. 3, exposing the drain electrode 48. A plurality of pixel electrodes 38a are formed on the passivation layer 52 alternating with the common electrodes 36b.

In generally, the gate insulator 35 is made of an inorganic material such as silicon nitride (SiNx) or silicon oxide ($SiO_2$), which has relatively large dielectric constant. When the data line 44 and the common electrodes 36b overlap each other, a parasitic capacitance is formed between the data line 44 and the common electrodes 36b, and vertical crosstalk occurs due to the parasitic capacitance. Therefore, the data line 44 and the common electrodes 36b should be spaced apart at a regular interval, which is noted to as "L" in FIG. 4B, not to form a parasitic capacitance.

However, the interval "L" increases the width of a black matrix 42 on a color filter substrate required to prevent leakage light, and this tends to lower the aperture ratio of the IPS LCD device.

Meanwhile, FIG. 5 illustrates distribution of the light transmittance in the related art IPS LCD device when voltage is applied. As shown in the figure, transmittance of light 60 in a first area "A1" over the common electrode 36b is relatively low and the pixel electrode 38a, while the transmittance of light is relatively high in a second area "A2" between the common electrode 36b and the pixel electrode 38a. This is due to difference in alignment directions of liquid crystal molecules (not shown) over the electrodes 36b and 38a and between the electrodes 36b and 38a under the applied voltage. That is, in the first area "A1", since the direction of the electric field is perpendicular to the electrodes 36b and 38a, the liquid crystal molecules are arranged perpendicular to the electrodes 36b and 38a. On the other hand, in the second area "A2", as the direction of the electric field is parallel to the electrodes 36b and 38a, the liquid crystal molecules is arranged parallel to the electrodes 36b and 38a.

Therefore, as the electrodes occupy more space, the aperture ratio of the IPS LCD device decreases. Besides, since the black matrix should cover the space between the common electrode and the data line, the aperture ratio reduces more.

Though the aperture ratio may increase by narrowing the width of the common electrodes and the pixel electrodes, it is also restricted.

FIG. 6 schematically shows distribution of electric field in the related art IPS LCD device. In FIG. 6, when voltage is applied to the common electrode 36b and the pixel electrode 38a, electric field 54, which is virtually expressed as power lines, is formed between the common electrode 36b and the pixel electrode 38a. The electric field 54 is the weakest in the middle "N" of the area between the common electrode 36b and the pixel electrode 38a because the density of the power lines is the sparsest in the region "N". The power of electric field gets weak as the interval between the common electrode 36b and the pixel electrode 38a becomes wide. If electric field is weak, the liquid crystal molecules do not aligned correctly. Accordingly, there is a limitation on enlarging the interval between the common electrode 36b and the pixel electrode 38a.

SUMMARY OF THE INVENTION

Accordingly, the present invention is directed to an array substrate for an in-plane switching liquid crystal display (IPS LCD) device and a manufacturing method of the array substrate that substantially obviates one or more of problems due to limitations and disadvantages of the related art.

An advantage of the present invention is to provide an array substrate for an in-plane switching liquid crystal display device that has the high aperture ratio and brightness.

Another advantage of the present invention is to provide a manufacturing method for an array substrate for an in-plane switching liquid crystal display device that increases the aperture ration and brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a substrate, a gate line and a data line crossing each other to define a pixel region on the substrate, a thin film transistor being electrically connected to the gate and data lines, a common line parallel to the gate line, a plurality of common electrodes being perpendicularly connected to the common line, and a plurality of pixel electrodes alternating with the plurality of common electrodes, wherein each common electrode has at least one first incline plane.

In another aspect, a manufacturing method of an array substrate for an in-plane switching liquid crystal display device includes forming a gate line on a substrate, forming a data line crossing the gate line, forming a thin film transistor being electrically connected to the gate and data lines, forming a common line parallel to the gate line, forming a passivation layer on the data line and the thin film transistor and patterning the passivation layer, forming a plurality of common electrodes electrically connected to the common line on the passivation layer, and forming a plurality of pixel electrodes alternating with the plurality of common electrodes on the passivation layer, wherein each common electrode has at least one first incline plane.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
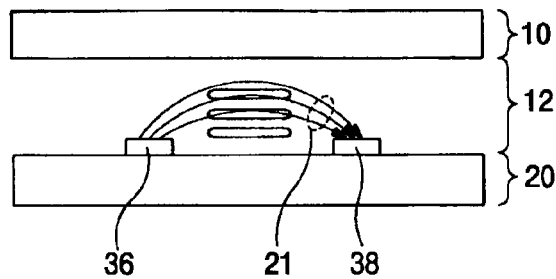
FIG. 1 is a schematic cross-sectional view of a related art in-plane switching liquid crystal display (IPS LCD) device.
Figure 2A:
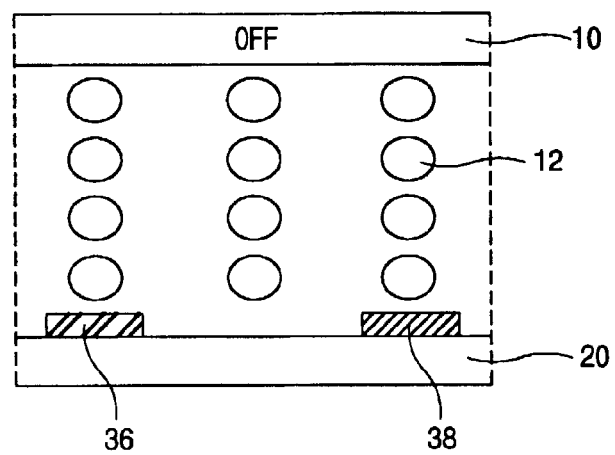
FIGS. 2A and 2B are cross-sectional views illustrating operations of the liquid crystal molecules at on and off states of a related art IPS LCD device, respectively.
Figure 2B:
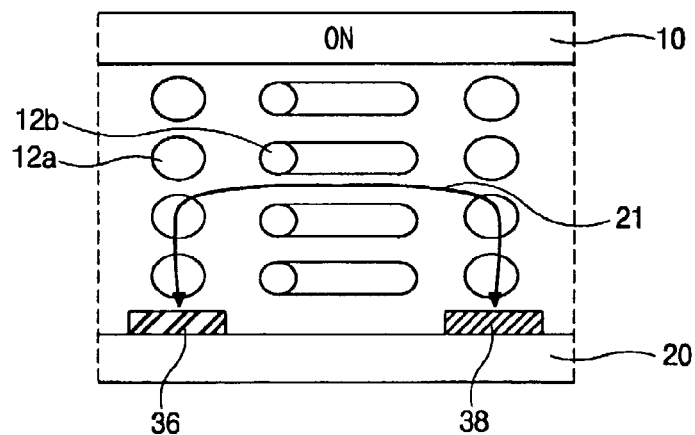
Figure 3:
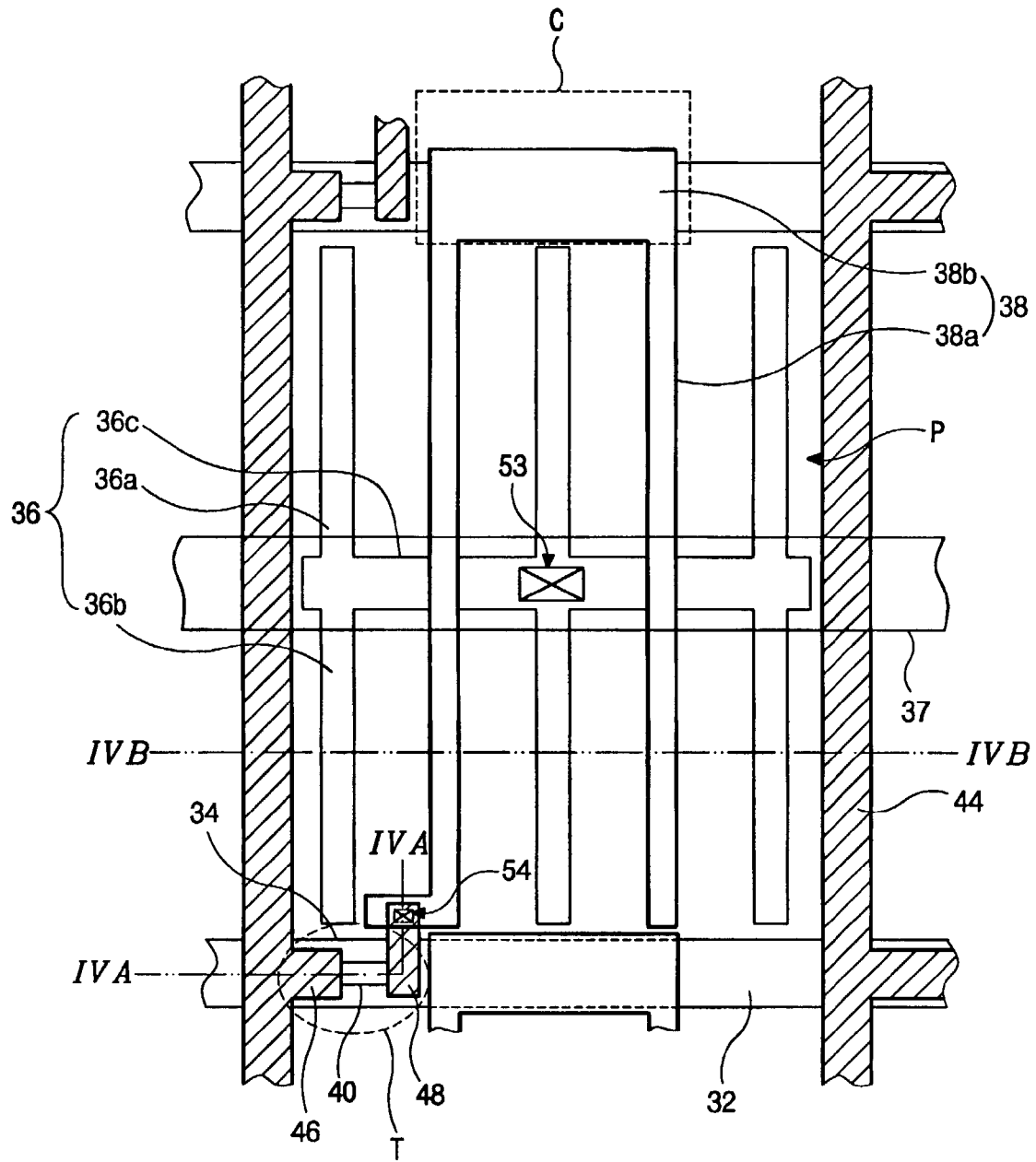
FIG. 3 is a plan view of an array substrate for a relate art IPS LCD device.
Figure 4A:
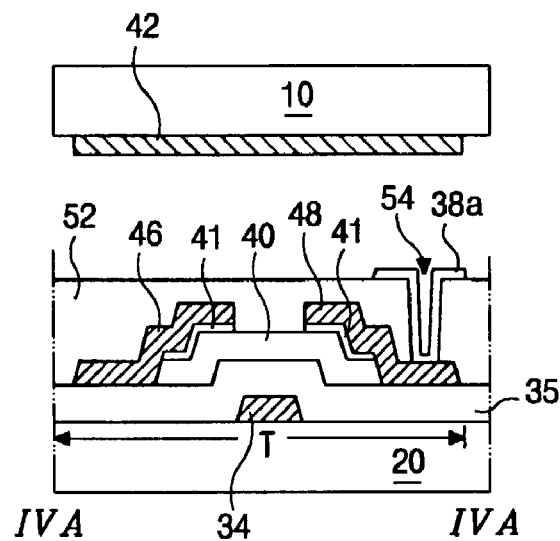
FIGS. 4A and 4B are cross-sectional views along the line IVA-IVA and the line IVB-IVB of FIG. 3, respectively.
Figure 4B:
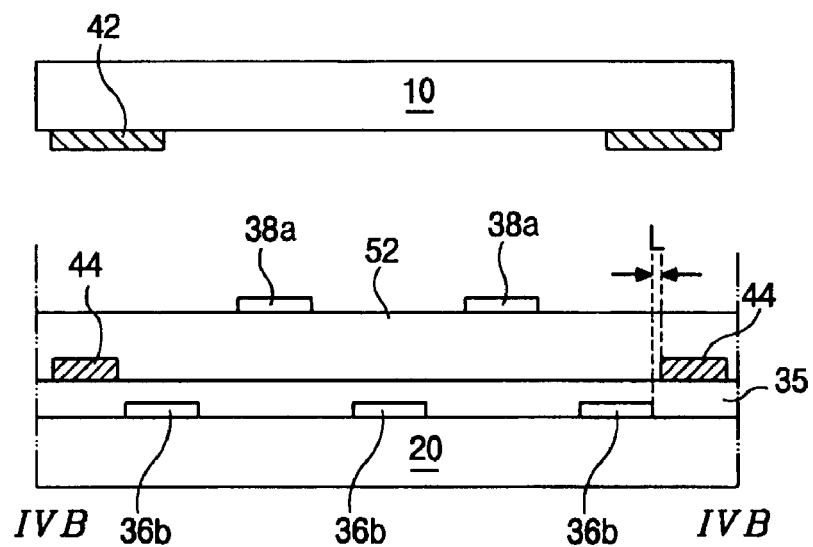
Figure 5:
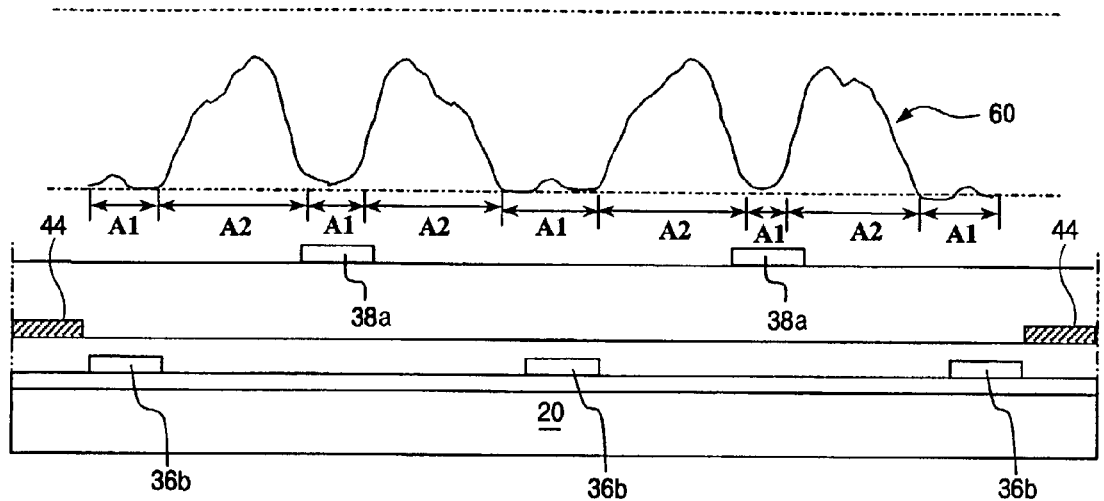
FIG. 5 is across-sectional view showing distribution of the light transmittance in the related art IPS LCD device.
Figure 6:
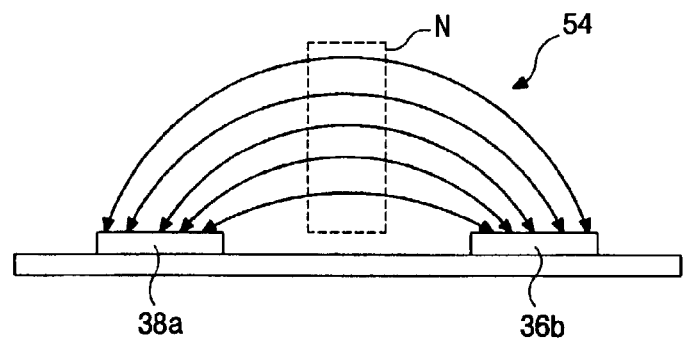
FIG. 6 is a schematic view showing distribution of electric field in the related art IPS LCD device.
Figure 7:
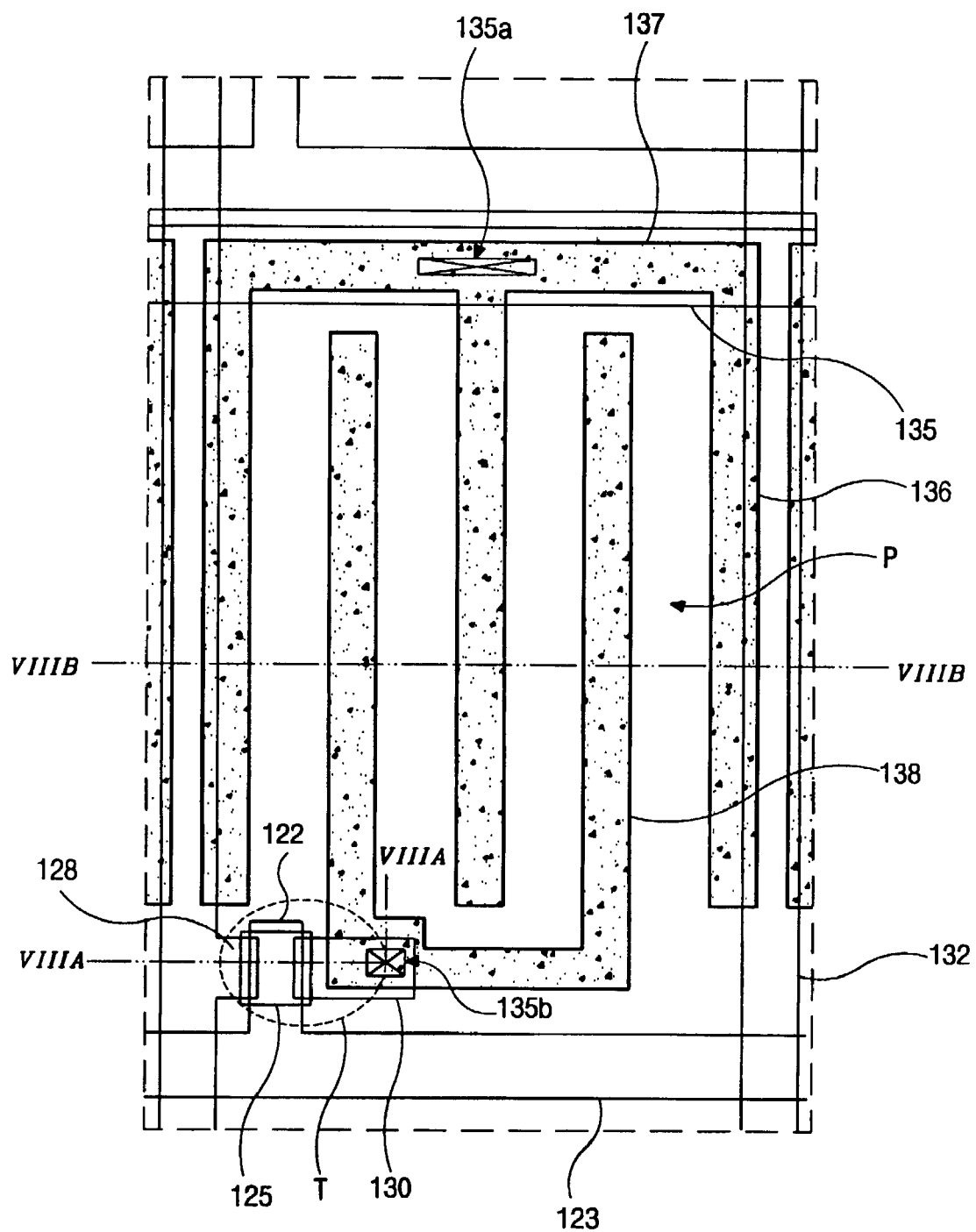
FIG. 7 is a plan view of an array substrate for an in-plane switching liquid crystal display (IPS LCD) device according to a first embodiment of the present invention.

FIG. 7 is a plan view of an array substrate for an in-plane switching liquid crystal display (IPS LCD) device according to a first embodiment of the present invention. In FIG. 7, a gate line 123 is formed horizontally in the context of the figure, and a gate electrode 122 extends vertically from the gate line 123. A data line 132 is formed vertically in the context of the figure, and a source electrode 128 extends horizontally from the data line 132. The gate line 123 and the data line 132 cross each other to define a pixel area "P". The gate electrode 122 and the source electrode 128 may be a part of the gate line 123 and the data line 132, respectively. Next, a drain electrode 130 is formed facing but separated from the source electrode 128. The gate electrode 122 and source and drain electrodes 128 and 130 form a thin film transistor "T" at the crossing of the gate line 123 and the data line 132. The thin film transistor "T" also includes an active layer 125 that overlaps the gate electrode 122 and source and drain electrodes 128 and 130.

In the pixel area "P", a common line 135 is formed horizontally in the context of the figure, so the common line 135 is parallel to the gate line 123. A common electrode, which includes a horizontal part 137 and a plurality of vertical parts 136, in the pixel area "P". The horizontal part 137 overlaps the common line 135 and is connected to the common line 135 through a first contact hole 135a. The plurality of vertical parts 136 extend vertically from the horizontal part 137 and outermost parts among the plurality of vertical parts 136 overlap the data line 132.

Next, a plurality of pixel electrodes 138 are formed vertically in the context of the figure, alternating with the vertical parts 136 of the common electrode in the pixel area "P". The pixel electrodes 138 are connected to the drain electrode 130 through a second contact hole 135b.

Figure 8A:
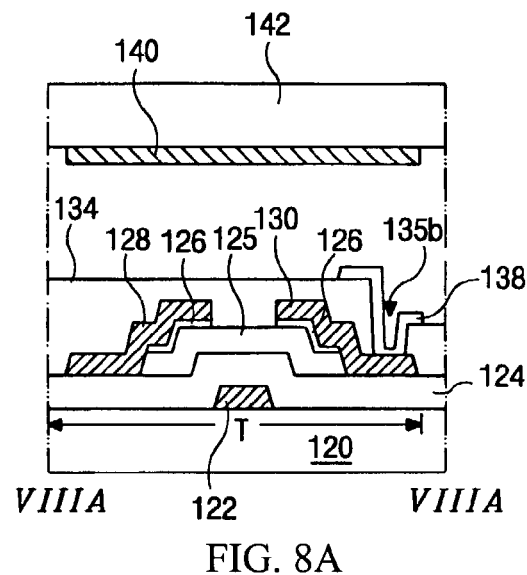
FIGS. 8A and 8B are cross-sectional views along the line VIIIA-VIIIA and the line VIIIB-VIIIB of FIG. 7, respectively.
Figure 8B:
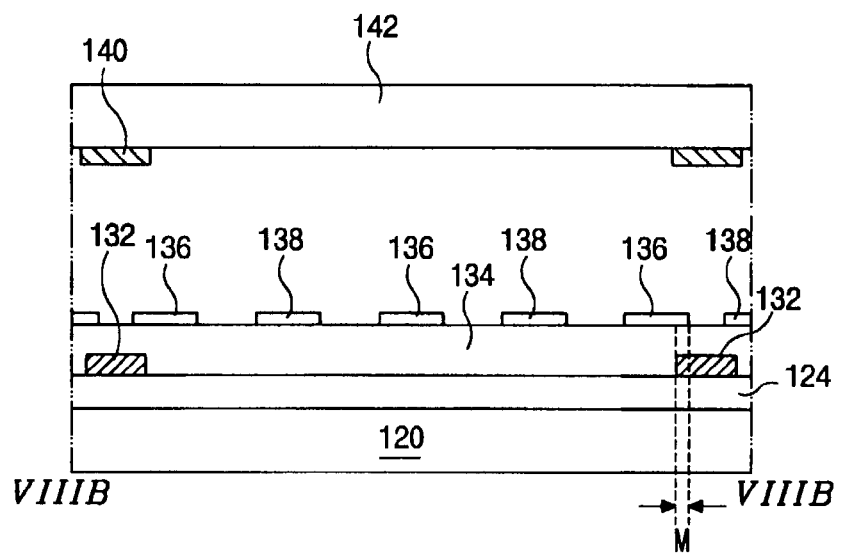

FIGS. 8A and 8B are cross-sectional views along line VIIIA-VIIIA and line VIIIB-VIIIB of FIG. 7, respectively. As shown in the figures, a gate electrode 122 is formed on the inside of a first substrate 120 (e.g., the side that faces the liquid crystal layer) and a gate insulator 124 covers the gate electrode 122. An active layer 125 of amorphous silicon and an ohmic contact layer 126 of doped amorphous silicon subsequently are formed on the gate insulator 124. Next, source and drain electrodes 128 and 130 are formed on the ohmic contact layer 126, and a data line 132 made of the same material as the source and drain electrodes 128 and 130 is formed on the gate insulator 124. The gate electrode 122, and source and drain electrodes 128 and 130 form a thin film transistor "T". A passivation layer 134 is formed on the data line 132 and source and drain electrodes 128 and 130. The passivation layer 134 is made of an organic material that has a relatively low dielectric constant. The organic material may be benzocyclobutene (BCB) or acrylic resin. The passivation layer 134 has a drain contact hole 135b exposing the drain electrode 130, which is referred to as the second contact hole in the description of FIG. 7. A plurality of common electrodes 136, which are referred to as a plurality of vertical parts of the common electrode in the description of FIG. 7, and a plurality of pixel electrodes 138 are formed on the passivation layer 134 with an alternating arrangement with each other. The outermost parts among the plurality of common electrodes 136 overlap the data line 132 by a width "M". The common electrodes 136 and the pixel electrodes 138 may be made of a transparent conducting material such as indium-tin-oxide (ITO) or indium-zinc-oxide (IZO).

Next, a second substrate 142 is disposed over and spaced apart from the first substrate 120. A black matrix 140 is formed on the inside of the second substrate 142 (e.g. the side facing the liquid crystal) to prevent leakage light. The black matrix 140 corresponds to the thin film transistor "T" and the data line 132. Though not illustrated in the figures, a color filter layer is formed on the black matrix 140. Also, an overcoat layer may be formed on the color filter layer.

Although the common electrodes 136 overlap the data line 132, a parasitic capacitance between the data line 132 and the common electrode 136 has little influence on the signals on the data line 132 and the common electrode 136 due to the low dielectric passivation layer 134. Therefore, the width of the black matrix 140 can be narrow, so that the aperture ratio and brightness of the IPS LCD increase.

Figure 9A:
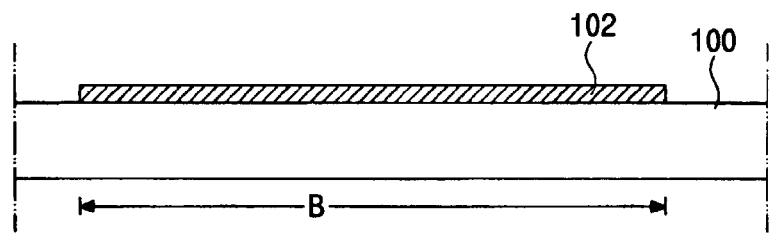
FIGS. 9A and 9B are schematic views showing structures of the electrodes according to the present invention.
Figure 9B:
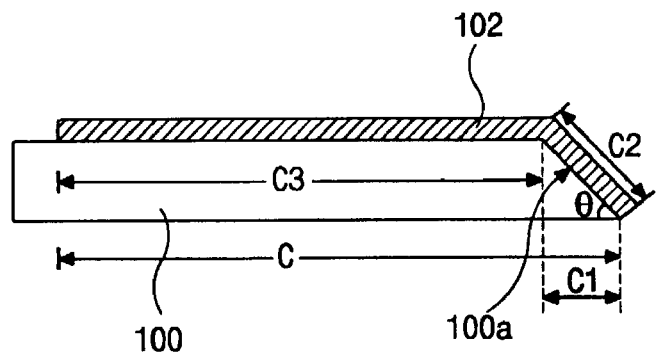
Figure 10:
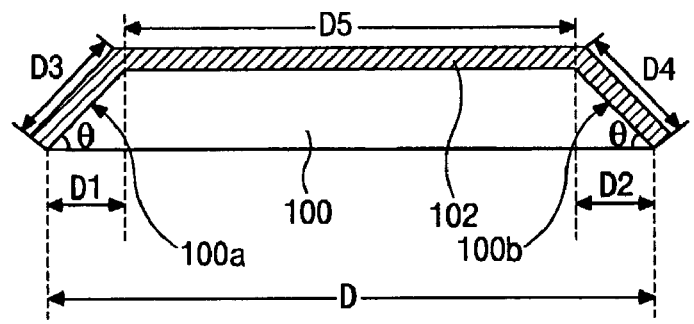
FIG. 10 is a schematic view showing another structure of the electrode according to the present invention.

On the other hand, other structure of the common and pixel electrodes that further increase the aperture ratio and brightness are possible. FIGS. 9A and 9B and FIG. 10 show exemplary structures of the electrodes according to other embodiments of the present invention.

FIG. 9A shows an electrode 102 formed on a flat passivation layer 100. The passivation layer 100 is made of an organic material having a thickness within a range of, for example, about 1.0 to 2.0 μm. The organic material may be one of benzocyclobutene (BCB) and acrylic resin. The electrode 102 may be either the common electrode or the pixel electrode. The width "B" of the electrode 102 is within a range of, for example, about 5.0 to 6.0 μm.

In FIG. 9B, the passivation layer 100 include a surface with an incline plane 100a, a portion of which contacts one end of the electrode 102. The incline plane 100a has an incline angle "θ" with respect to the bottom surface of the passivation layer 100. For example, if the incline angle "θ" is about 45 degrees with respect to the bottom surface of the passivation layer 100 and the thickness of the passivation layer 100 in a non-inclined portion is, for example, about 1.3 μm, a first length "C1" corresponding to the horizontal component of the incline plane 100a is about 1.3 μm. Therefore, a second length "C2" corresponding to the length of the incline plane 100a portion becomes about 1.8 μm. By the way, if the length along a surface of the electrode 102, which is expressed by the sum of the second length "C2" and the third length "C3", is, for example, about 6 μm, a third length "C3" corresponding to the flat part of the electrode 102 parallel to the bottom surface of the passivation layer 100 becomes about 4.2 μm. Accordingly, because of the incline portion, the actual width "C" of area that the electrode 102 occupies is about 5.5 μm, which is the sum of the first length "C1" (1.3 μm) and the third length "C3" (4.2 μm).

On the other hand, as shown in FIG. 10, the passivation layer 100 may have two incline planes 100a and 100b under the electrode 102. Here, for example, if the passivation layer 100 has a thickness of about 1.3 μm in a non-inclined portion, and the incline planes 100a and 100b have an incline angle "θ" of about 45 degrees with respect to the bottom surface of the passivation layer 100, first and second length "D1" and "D2" corresponding to the base lines of the incline planes 100a and 100b are about 1.3 μm. Therefore, third and fourth lengths "D3" and "D4" corresponding to the incline planes 100a and 100b each become about 1.8 μm. If a length along a cross-sectional surface of the electrode 102 is, for example, about 6 μm, a fifth length "D5" corresponding to the flat part of the electrode 102 parallel to the bottom surface of the passivation layer 100 becomes about 2.4 μm. Accordingly, the width "D" of area that the electrode 102 occupies is about 5 μm, which is the sum of the first length "D1" (1.3 μm), the second length "D2" (1.3 μm), and the fifth length "D5" (2.4 μm). The width "D" of about 5 μm gets much smaller than the width "C" of about 5.5 μm of FIG. 9B.

As stated above, if the passivation layer has an incline portion, the cross-sectional spaces that the electrodes occupy come to decrease. Therefore, the area that light passes through increases, so the aperture ratio and brightness improve more.

Other embodiments having the above structure will be described with reference to attached figures.

Figure 11A:
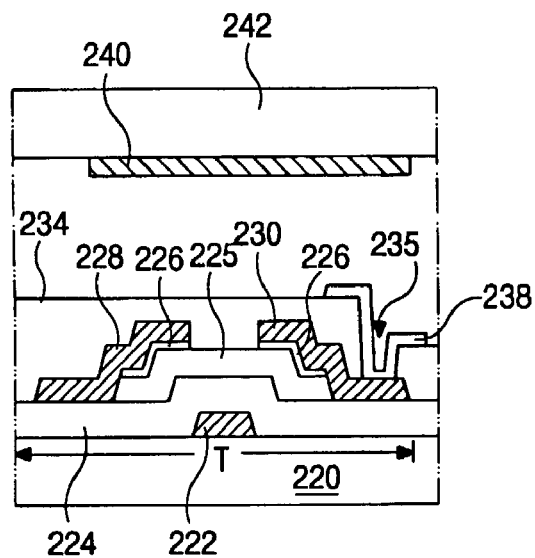
FIGS. 11A and 11B are cross-sectional views of an IPS LCD device according to a second embodiment of the present invention.
Figure 11B:
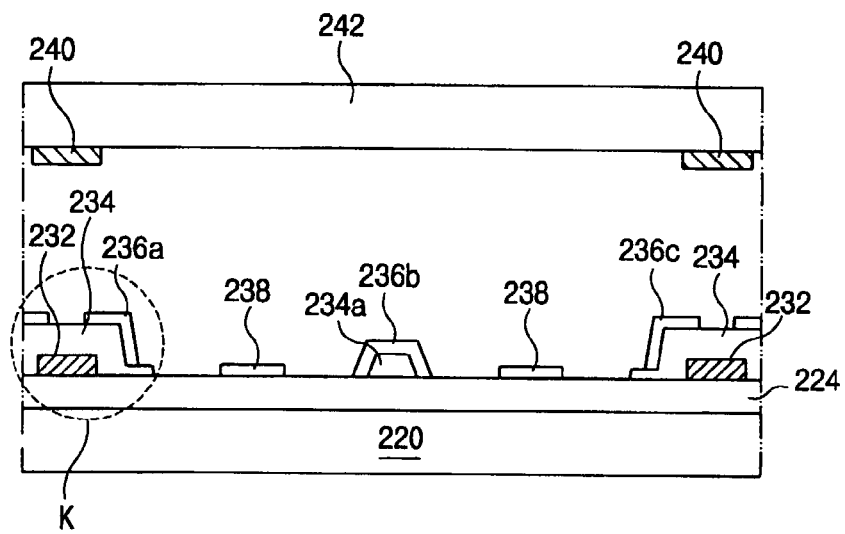

FIGS. 11A and 11B are cross-sectional views of an in-plane switching liquid crystal display device according to a second embodiment of the present invention. FIGS. 11A and 11B correspond to cross-sections along the line VIIIA-VIIIA and the line VIIIB-VIIIB of FIG. 7, respectively.

Figure 12:
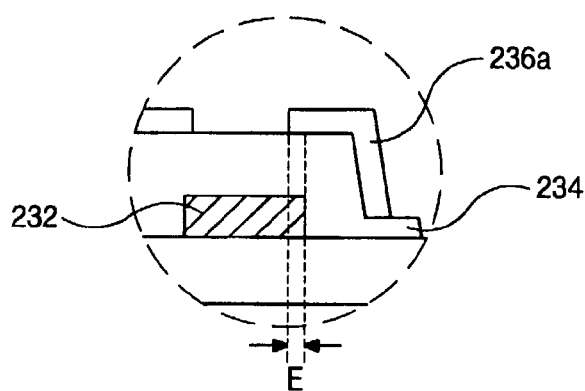
FIG. 12 is a magnified view of the region "K" of FIG. 11B.

In FIGS. 11A and 11B, a gate electrode 222 is formed on the inside of a first substrate 220, and a gate insulator 224 covers the gate electrode 222. An active layer 225 of amorphous silicon and an ohmic contact layer 226 of doped amorphous silicon subsequently are formed on the gate insulator 224. Next, source and drain electrodes 228 and 230 are formed on the ohmic contact layer 226, and a data line 232 made of the same material as the source and drain electrodes 228 and 230 is formed on the gate insulator 224. The gate electrode 222, and source and drain electrodes 228 and 230 form a thin film transistor "T". A passivation layer 234 is formed on the data line 232 and the thin film transistor "T". The passivation layer 234 and the passivation pattern 234a have incline planes. The passivation layer 234 and the passivation pattern 234a are made of an organic material such as benzocyclobutene (BCB) or acrylic resin, which has a relatively low dielectric constant. The passivation layer 234 has a drain contact hole 235 exposing the drain electrode 230. A plurality of common electrodes 236a, 236b and 236c are formed on the passivation layer 234 and the passivation pattern 234a. The common electrodes 236a, 236b and 236c have at least one slope corresponding to the incline planes of the passivation layer 234 and the passivation pattern 234a. Here, first and third common electrodes 236a and 236c overlap the data line 234 by a width "E" as shown in FIG. 12. FIG. 12 is a view magnified of a region "K" of FIG. 11B.

Referring again to FIG. 11B, a plurality of pixel electrodes 238 are formed on the gate insulator 224 alternating with the common electrodes 236a, 236b and 236c. The common electrodes 236a, 236b and 236c and the pixel electrodes 238 may be made of a transparent conducting material such as indium-tin-oxide (ITO) or indium-zinc-oxide (IZO).

A second substrate 242 is disposed over and spaced apart from the first substrate. A black matrix 240 is formed on the inside of the second substrate 242, (e.g. the surface of the second substrate to facing the first substrate) and corresponds to the thin film transistor "T" and the data line 232. Although not illustrated in the figures, a color filter layer is formed on the black matrix 240. Also, an overcoat layer may be formed on the color filter layer.

In this embodiment, because the common electrodes have at least one incline plane, the width of space that the common electrodes occupy is reduced. For example, when a length along the cross-sectional surface of the common electrodes is 6 μm, the width of the first and third common electrodes is reduced by about 0.5 μm, respectively, in comparison with that of the first embodiment as shown in FIG. 9B, and the width of the second common electrode is reduced by about 1 μm as shown in FIG. 10. Therefore, in this example of the second embodiment, the width that the common electrodes occupy is narrower than the example of the first embodiment by a total of about 2 μm, and the interval between the common electrode and the pixel electrode is wider than in the example of the first embodiment.

Figure 13:
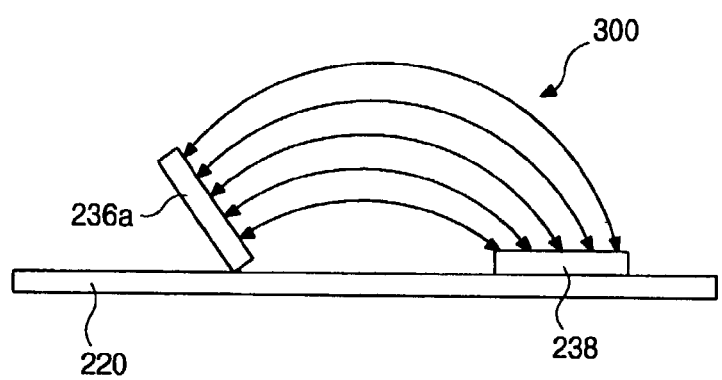
FIG. 13 is a schematic view showing distribution of electric field in the IPS LCD device according to the second embodiment.

FIG. 13 schematically shows distribution of electric field in the IPS LCD device according to the second embodiment. In FIG. 13, when voltage is applied to the common electrode 236a and the pixel electrode 238, electric field 300, which is virtually expressed as power lines, is formed between the common electrode 236a and the pixel electrode 238. Although the interval between the common electrode 236a and the pixel electrode 238 is farther than in the related art, the strength of electric field 300 is stronger because the virtual distance of the electrodes, between which electric field 300 is formed, is narrower because of the incline plane of the common electrode 236a.

As stated above, in the second embodiment, since the common electrodes overlap the data line, the width of the black matrix is relatively narrow. Moreover, as the interval between the common electrode and the pixel electrode is wider because of the incline plane, the aperture ratio and brightness can increase without reducing the power of electric field.

Figure 14A:
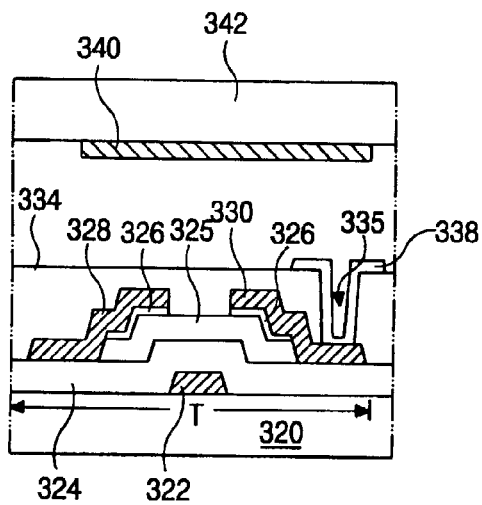
FIGS. 14A and 14B are cross-sectional views of an IPS LCD device according to a third embodiment of the present invention.
Figure 14B:
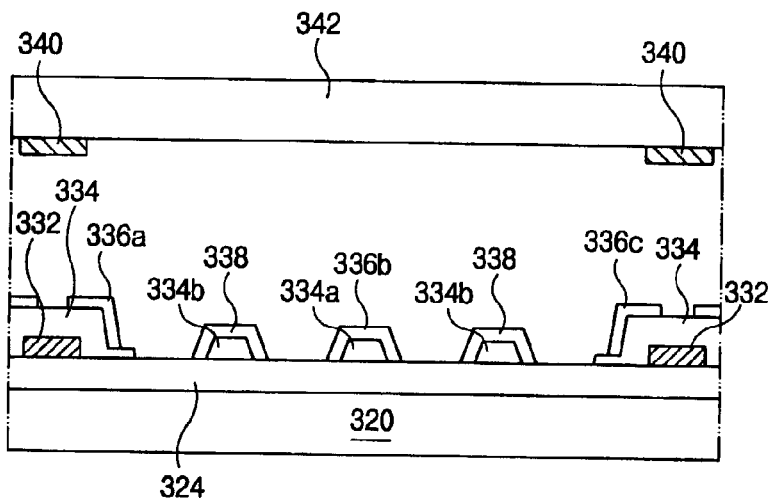

FIGS. 14A and 14B are cross-sectional views of an in-plane switching liquid crystal display device according to a third embodiment of the present invention.

In FIGS. 14A and 14B, a gate electrode 322 is formed on the inside of a first substrate 320 and a gate insulator 324 covers the gate electrode 322. An active layer 325 of amorphous silicon and an ohmic contact layer 326 of doped amorphous silicon subsequently are formed on the gate insulator 324. Next, source and drain electrodes 328 and 330 are formed on the ohmic contact layer 326, and a data line 332 made of the same material as the source and drain electrodes 328 and 330 is formed on the gate insulator 324. The gate electrode 322 and source and drain electrodes 328 and 330 form a thin film transistor "T".

A passivation layer 334 is formed on the data line 332 and the thin film transistor "T". Also, first and second passivation patterns 334a and 334b are formed between the data lines 332 on the gate insulator 324. The passivation layer 334 and the passivation patterns 334a and 334b have incline planes. The passivation layer 334 and the passivation patterns 334a and 334b are made of an organic material such as benzocyclobutene (BCB) or acrylic resin, which has a relatively low dielectric constant. The passivation layer 334 has a contact hole 335 exposing the drain electrode 330.

A plurality of common electrodes 336a, 336b and 336c are formed on the passivation layer 334 and the first passivation pattern 334a. The common electrodes 336a, 336b and 336c have at least one slope corresponding to the incline planes of the passivation layer 334 and the first passivation pattern 334a. Here, first and third common electrodes 336a and 336c overlap the data line 332.

Next, a plurality of pixel electrodes 338 are formed on the second passivation patterns 334b alternating with the common electrodes 336a, 336b and 336c. The pixel electrodes 338 also have slopes corresponding to the incline planes of the second passivation patterns 334b. The common electrodes 336a, 336b and 336c and the pixel electrodes 338 may be made of a transparent conducting material such as indium-tin-oxide (ITO) or indium-zinc-oxide (IZO).

On the other hand, a second substrate 342 is disposed over and spaced apart from the first substrate 320. A black matrix 340 is formed on the inside of the second substrate 342, (e.g. the surface facing the first substrate) and corresponds to the thin film transistor "T" and the data line 332. A color filter layer (not shown) is formed on the black matrix 340. Also, an overcoat layer may be formed on the color filter layer.

Figure 15:
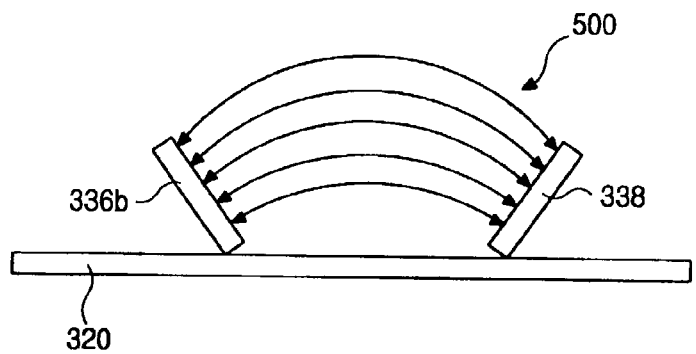
FIG. 15 is a schematic view showing distribution of electric field in the IPS LCD device according to the third embodiment.

FIG. 15 schematically shows distribution of electric field in the IPS LCD device according to the third embodiment. In FIG. 15, when voltage is applied to the common electrode 336b and the pixel electrode 338, electric field 500 is formed between the common electrode 336b and the pixel electrode 338. The electric field 500 is stronger than that of the second embodiment due to the incline planes of both the common and pixel electrodes 336b and 338.

In the third embodiment, for example, when a length along the cross-sectional surface of the common electrodes is 6 μm, the width that the common electrodes occupy is reduced by about 2 μm in comparison with that of the example of the first embodiment like the second embodiment. Besides, since the pixel electrodes have the incline planes, the width that the pixel electrodes occupy is reduced by about 2 μm in comparison with that of the example of the first embodiment as shown in FIG. 10. Accordingly, the total reduced width is about 4 μm in comparison with the first embodiment.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   a substrate;
   a gate line and a data line on the substrate, the gate and data lines crossing each other to define a pixel region;
   a thin film transistor electrically connected to the gate and data lines;
   a common line parallel to the gate line;
   a passivation layer on the thin film transistor;
   a plurality of common electrodes formed on the passivation layer and perpendicularly connected to the common line, wherein each of the plurality of common electrodes adjacent the data line has a single flat plane overlapping the data line and a single first incline plane extending from the single flat plane;
   a plurality of pixel electrodes alternating with the plurality of common electrodes;
   and
   a plurality of passivation patterns extending from the passivation layer and located under the plurality of common electrodes, the plurality of passivation patterns having at least one second incline plane corresponding to the at least one first incline plane,
   wherein the at least one first incline plane slopes with an incline angle of about 45 degrees with respect to the substrate.

2. The array substrate according 1, wherein a width along a cross-sectional surface of each common electrode or pixel electrode is within a range of about 5.5 to 6 μm.

3. The array substrate according to claim 1, wherein the plurality of passivation patterns include one of benzocyclobutene (BCB) and acrylic resin.

4. The array substrate according to claim 3, wherein the plurality of passivation patterns have a thickness within a range of about 1 to 2 μm.

5. The array substrate according to claim 3, wherein the plurality of common electrodes overlap the data line.

6. The array substrate according to claim 1, wherein each pixel electrode has at least one second incline plane.

7. The array substrate according to claim 6, wherein the at least one second incline plane slopes with an incline angle of about 45 degrees with respect to the substrate.

8. The array according to claim 7, wherein a width along a cross-sectional surface of each pixel electrode is within a range of about 5.5 to 6 μm.

9. The array substrate according to claim 6, further comprising a plurality of first passivation patterns under the plurality of common electrodes, the plurality of first passivation patterns having at least one third incline plane corresponding to the at least one first incline plane.

10. The array substrate according to claim 9, further comprising a plurality of second passivation patterns under the plurality of pixel electrodes, the plurality of second passivation patterns having at least one fourth incline plane corresponding to the at least one second incline plane.

11. The array substrate according to claim 10, wherein the plurality of first and second passivation patterns include one of benzocyclobutene (BCB) and acrylic resin.

12. The array substrate according to claim 11, wherein the plurality of first and second passivation patterns have a thickness within a range of about 1 to 2 μm.

13. The array substrate according to claim 1, wherein the plurality of common electrodes and the plurality of pixel electrodes include one of indium-tin-oxide (ITO) and indium-zinc-oxide (IZO).

14. A method of manufacturing an array substrate for an in-plane switching liquid crystal display device, comprising:
- forming a gate line on a substrate;
- forming a data line crossing the gate line;
- forming a thin film transistor electrically connected to the gate and data lines;
- forming a common line parallel to the gate line;
- forming a passivation layer on the data line and the thin film transistor and patterning the passivation layer;
- forming a plurality of common electrodes on the passivation layer, the plurality of common electrodes perpendicularly connected to the common line, wherein each of the plurality of common electrodes adjacent the data line has a single flat plane overlapping the data line and a single first incline plane extending from the single first plane;
- forming a plurality of pixel electrodes on the passivation layer, the plurality of pixel electrodes alternating with the plurality of common electrodes; and
- forming a plurality of passivation patterns to extend from the passivation layer, wherein the plurality of passivation patterns have at least one incline plane corresponding to the first incline plane of the common electrodes,
- wherein the at least one first incline plane slopes with an incline angle of about 45 degrees with respect to the substrate.

15. The method according to claim 14, wherein a length along a cross-sectional surface of each common electrode is within a range of about 5.5 to 6 μm.

16. The method according to claim 14, wherein the passivation layer includes one of benzocyclobutene (BCB) and acrylic resin.

17. The method according to claim 16, wherein the passivation layer has a thickness within a range of about 1 to 2 μm.

18. The method according to claim 16, wherein the plurality of common electrodes overlap the data line.

19. The method according to claim 14, wherein each pixel electrode has at least one second incline plane.

20. The method according to claim 19, wherein the at least one second incline plane slopes with an incline angle of about 45 degrees with respect to the substrate.

21. The method according to claim 20, wherein a width along a cross-sectional surface of each pixel electrode is within a range of about 5.5 to 6 μm.

22. The method according to claim 19, wherein the passivation layer includes one of benzocyclobutene (BCB) and acrylic resin.

23. The method according to claim 22, wherein the passivation layer has a thickness within a range of about 1 to 2 μm.

24. The method according to claim 14, wherein the plurality of common electrodes and the plurality of pixel electrodes includes one of indium-tin-oxide (ITO) and indium-zinc-oxide (IZO).

* * * * *